US008422557B2

United States Patent
Chiang et al.

(10) Patent No.: US 8,422,557 B2
(45) Date of Patent: Apr. 16, 2013

(54) METHOD OF MOTION ESTIMATION FOR VIDEO COMPRESSION

(75) Inventors: Chen Kuo Chiang, Banciao (TW); Hwai Chung Fei, Taipei (TW); Shang Hong Lai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1515 days.

(21) Appl. No.: 11/740,559

(22) Filed: Apr. 26, 2007

(65) Prior Publication Data
US 2008/0159392 A1    Jul. 3, 2008

(30) Foreign Application Priority Data
Dec. 29, 2006    (TW) ................................ 95149735 A

(51) Int. Cl.
*H04N 7/12*      (2006.01)
(52) U.S. Cl.
USPC ............. 375/240.16; 375/240.12; 375/240.24
(58) Field of Classification Search ............... 375/240.1, 375/240.12, 240.15, 240.16, 240.18, 240.24, 375/240.02, 240.13, 240.14; 382/272, 236, 382/238, 286, 300
See application file for complete search history.

(56) References Cited

U.S. PATENT DOCUMENTS

| | | | | |
|---|---|---|---|---|
| 5,673,339 A | * | 9/1997 | Lee | 382/236 |
| 6,438,275 B1 | * | 8/2002 | Martins et al. | 382/300 |
| 2004/0258156 A1 | * | 12/2004 | Chujoh et al. | 375/240.16 |
| 2006/0056511 A1 | * | 3/2006 | Rehan et al. | 375/240.12 |

* cited by examiner

*Primary Examiner* — Farid Homayounmehr
*Assistant Examiner* — Suman Debnath
(74) *Attorney, Agent, or Firm* — Novak Druce Connolly Bove + Quigg LLP

(57) ABSTRACT

A motion estimation method for video compression comprises the following steps. First, an initial simplex comprising three points is determined based on motion vectors in blocks of a current frame and a previous frame, and a point having a largest function value among the three points is replaced with a point having a smaller function value to form a simplex. The replacement is repeated until two points of the three points of the simplex converge to a same point. The iteration is performed by downhill simplex search including operations of reflection, expansion, contraction and shrinkage to find a point for replacement. The motion estimation method for video compression can also use multi-reference frames. An initial simplex comprising four points is determined based on motion vectors of a current frame with reference to a plurality of previous frames, and a point having a largest function value among the four points is repeatedly replaced with a point having a smaller function value to form a simplex until two points of the four points of the simplex converge to a same point.

19 Claims, 6 Drawing Sheets

METHOD OF MOTION ESTIMATION FOR VIDEO COMPRESSION

BACKGROUND OF THE INVENTION (A) Field of the Invention

The present invention relates to a method of motion estimation for video compression.

(B) Description of the Related Art

Due to the strong demand of storing and transmitting an enormous amount of video data, video compression has been a very important and practical problem in recent years. Motion estimation (ME) is an indispensable part in video compression and has been popularly utilized to reduce the spatial and temporal information redundancy. Block matching algorithms (BMA) are required for ME in many video standards, such as MPEG-1 [1], MPEG-2 [2], MPEG-4 [3], H.263 [4], and H.264 [5]. In BMA, frames are divided into non-overlapping macroblocks, and it needs to find a motion vector (MV) in a pre-defined search range for each macroblock. The simplest BMA is the full search (FS) algorithm. This algorithm exhaustively searches over all possible locations in the search range and picks the most suitable block as the MV, so that it finds the optimal solution within the search range. However, FS has a fatal drawback, i.e. the high computational cost. Therefore, it is not practical to use FS in video compression, especially in real-time applications.

To reduce the computational complexity of FS, many fast BMAs, such as three-step search, new three step search, four step search (FSS), and diamond search (DS) are proposed. Fast BMAs strategically check possible candidates in the search range to decrease the number of search points. Most video encoders apply fast BMAs for motion estimation since they can significantly reduce the search time without noticeable video quality degradation. The most important criterion for a fast BMA is to find an accurate MV with as few search points as possible.

In multi-reference frame motion estimation, the method for obtaining a motion vector of a block from multi-reference frames becomes crucial for current video compression.

SUMMARY OF THE INVENTION

The present invention proposes a motion estimation method for video compression, intending to significantly reduce number of search points in algorithm computation and still keep superior video quality.

The motion estimation method for video compression of the present invention comprises the following steps. First, an initial simplex comprising three points is determined based on motion vectors in blocks of a current frame and a previous frame, and a point having a largest function value among the three points is replaced with a point having a smaller function value to form a simplex. The replacement step is repeated until two points of the three points of the simplex converge to a same point. The iteration is performed by downhill simplex search including operations of reflection, expansion, contraction and shrinkage to find a point for replacement. The motion vectors are selected from candidates of (1) mean value of motion vectors of preceding blocks with reference to a current block in a current frame; (2) mean value of motion vectors of succeeding blocks with reference to a block in the previous frame corresponding to a current block; (3) a motion vector of a block in the previous frame corresponding to a current block of the current frame; and (4) a zero vector. According to an embodiment of the present invention, the function values are in response to a function of sum of squared errors (SSE).

The motion estimation method for video compression can also use multi-reference frames. First, an initial simplex comprising four points is determined based on motion vectors of a current frame with reference to a plurality of previous frames, and a point having a largest function value among the four points is replaced with a point having a smaller function value to form a simplex. The replacement is repeated until two points of the four points of the simplex converge to a same point. A motion vector of the current frame with reference to a previous frame ahead of the current frame by a plurality of frames can be obtained by adding segmented motion vectors.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Downhill simplex search proposed by Nelder, J. A., Mead, R. in 1965 ("A simplex method for function minimization." The Comput. J., Vol. 7, 1965, pp. 308-313) is a derivative-free multidimensional function minimization method, and relates to a pure mathematics operation. The downhill simplex search is used for motion estimation of video compression in accordance with the present invention.

In the downhill simplex search, a collection of n+1 points in n-dimensional space is called a simplex and each point in the simplex has a specific function value. For example, in two dimensions, a simplex is a triangle. In three dimensions it is a tetrahedron. The downhill simplex search takes a series of steps to update the simplex. During these steps, the point with the highest distortion value is iteratively replaced by a new point with a smaller distortion value until the stopping criterion is satisfied. These steps consist of reflection, expansion, contraction and shrinkage operations. It is an iterative minimization process to search for the location with minimal distortion value. FIGS. 1(a), 1(b), 1(c) and 1(d) respectively show the four main steps in downhill simplex search and the geometrical interpretation of these operations.

Figure 1A:
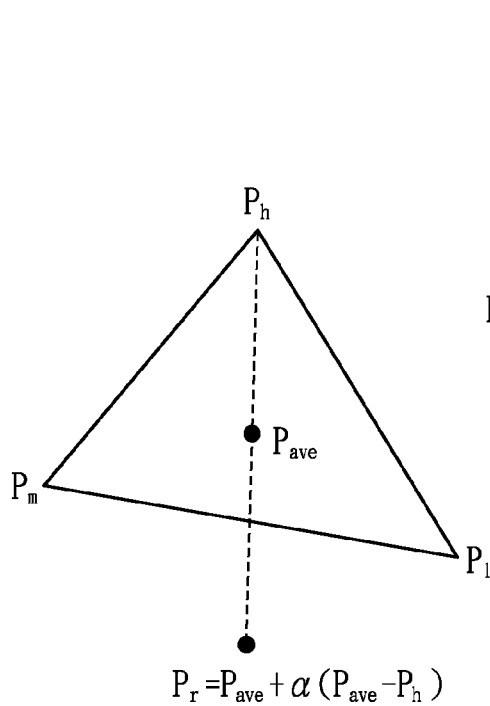
FIGS. 1(a), 1(b), 1(c) and 1(d) illustrate downhill simplex search in accordance with the present invention.

As shown in FIG. 1(a), the downhill simplex search starts with an initial simplex, which can be generated from a fixed simplex or from a motion-predicted simplex. In each iteration, it determines the points with the highest, the second highest and the lowest function values, which are represented by $Y_h$, $Y_m$, $Y_l$, respectively, with the corresponding points given by $P_h$, $P_m$, and $P_l$ respectively. Then, a new point $P_r$ is generated by reflecting the worse point according to the following equation:

$$P_r = P_{ave} + \alpha(P_{ave} - P_h), \alpha > 0$$

where α is a positive constant and $P_{ave}$ is the average of all points of the simplex given by $$P_{ave} = \frac{1}{n+1} \sum_{i=1}^{n+1} P_i$$

Figure 1B:
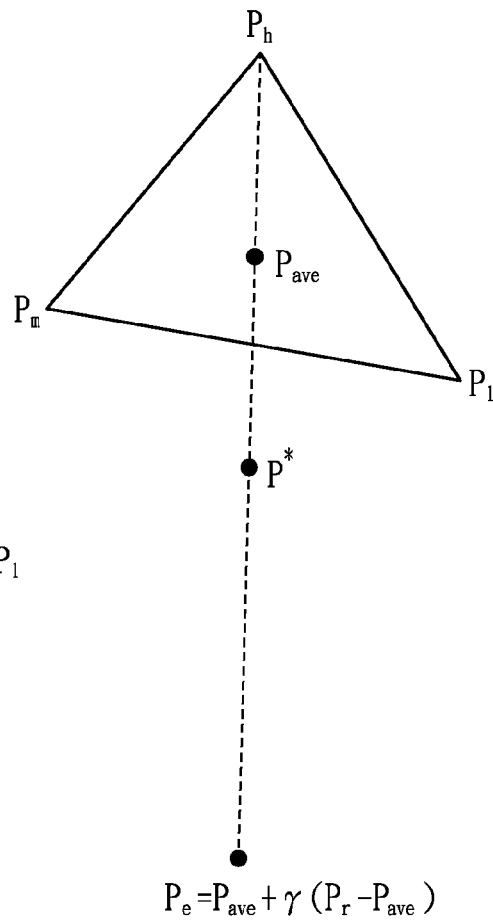

As shown in FIG. 1(b), if the reflection point has smaller function value than that of the point $P_l$, the reflection is expanded in order to extend the search space in the same direction for further improvement. An expansion point $P_e$ is defined as $$P_e = P_{ave} + \gamma(P_r - P_{ave}), \gamma \geq 1$$

where γ is a constant greater than or equal to one.

Figure 1C:
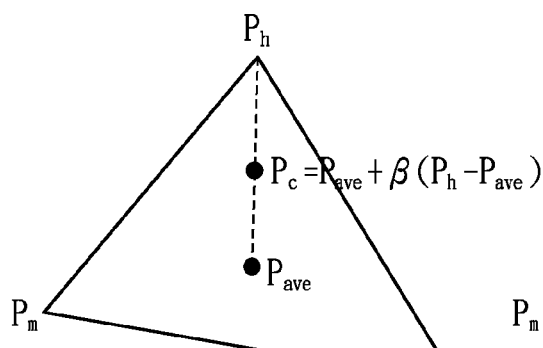

Referring to FIG. 1(c), when the function value $Y_r$ is greater than $Y_m$ and less than or equal to $Y_h$, $P_r$ replaces $P_h$ directly and the contraction operation is performed. If $Y_r$ is greater than $Y_h$, no replacement is needed for the contraction step. This is because searching for outer space results in a worse function value, it is more likely to improve the results along the opposite direction, i.e. contracting to inner space. An expansion point $P_e$ is defined as $$P_e = P_{ave} + \beta(P_h - P_{ave}), 0 < \beta < 1$$

where β is a constant between zero and one.

Figure 1D:
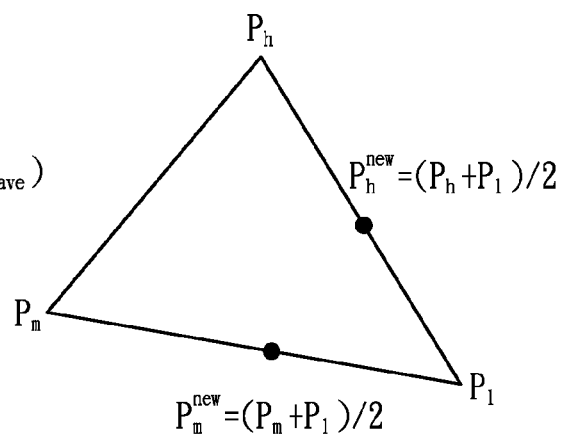

As shown in FIG. 1(d), if contraction has failed, shrinkage will be the next attempt. A shrinkage point $P_i^{new}$ is defined as $$p_i^{new} = (p_i + p_l)/2, i = 1 \ldots n+1, i \neq l$$

The stopping criterion is when any two of the three points in the simplex move to the same point. In other words, the process stops when the simplex degenerates.

Figure 2:
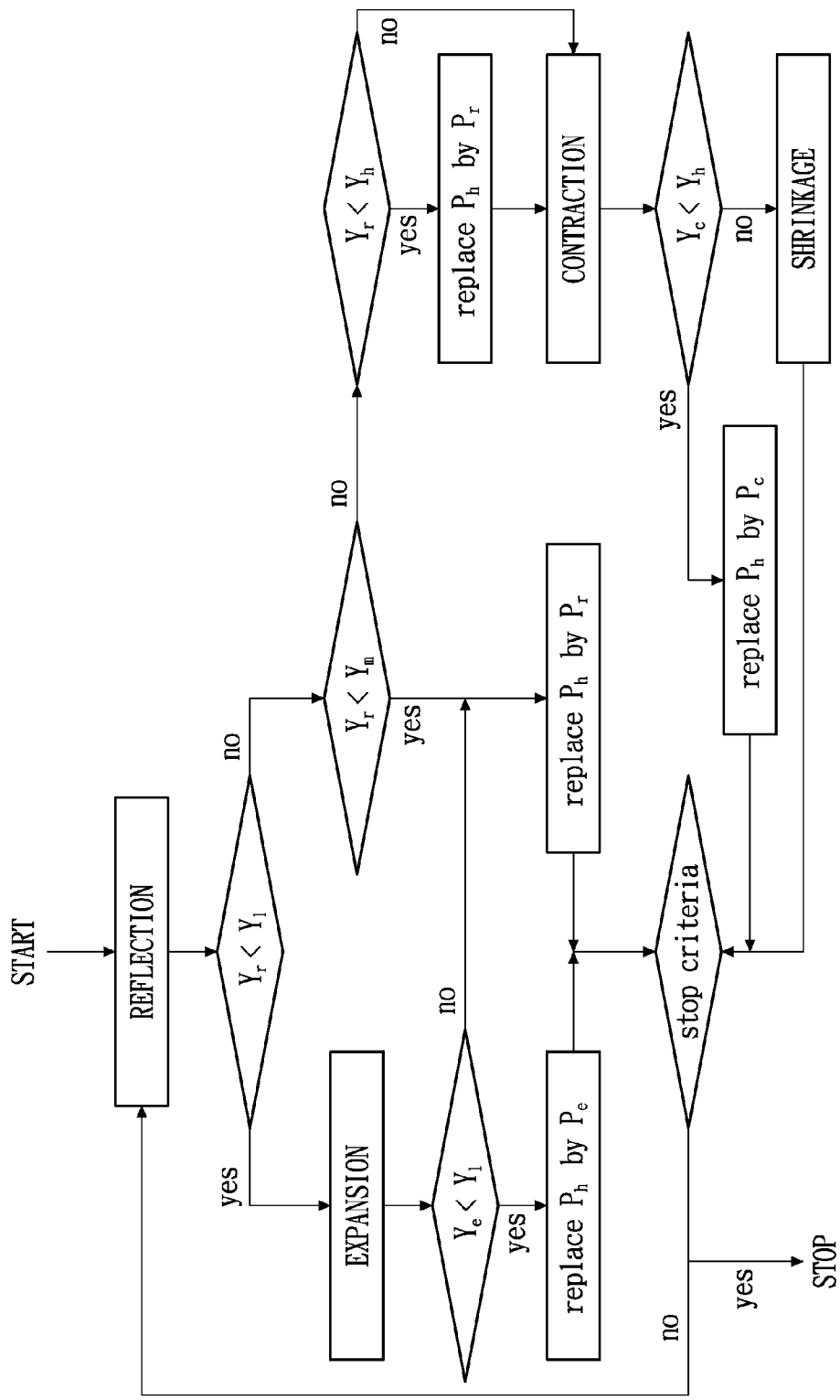
FIG. 2 illustrates the flow chart of downhill simplex search method in accordance with the present invention.

FIG. 2 shows the flow chart of the iterative simplex update procedure. Each iteration starts with the reflection step. In this step, it reflects the point of $P_h$ according to α. Conceptually, it finds the point in the opposite direction of $P_h$ and tries to find a smaller function value. If a smaller $Y_r$ is obtained, the direction is probably right. Thus, it goes to the expansion step. In the expansion step, it goes further along the direction according to γ. If a large $Y_r$ is obtained, even larger than $Y_h$ after the reflection step, it goes to the contraction step. It means it is difficult to find a smaller function value along this direction. Therefore, it goes to the reverse direction. In the shrinkage step, all points except the point with the lowest function value are moved toward the lowest point to make the triangular bounding area shrunk. After each step, the point with the highest function value is replaced by the new point with a smaller function value, and then the stopping criterion is checked to see if it is satisfied to terminate the iterations.

In the motion estimation problem, the goal is to find motion vectors (MVs) with the smallest block distortion measurement (BDM). It is just like the minimization process to search the best MVs in a multi-dimension space. In this point of view, downhill simplex search fits well to the motion estimation problem and the algorithm can be easily implemented.

Figure 3:
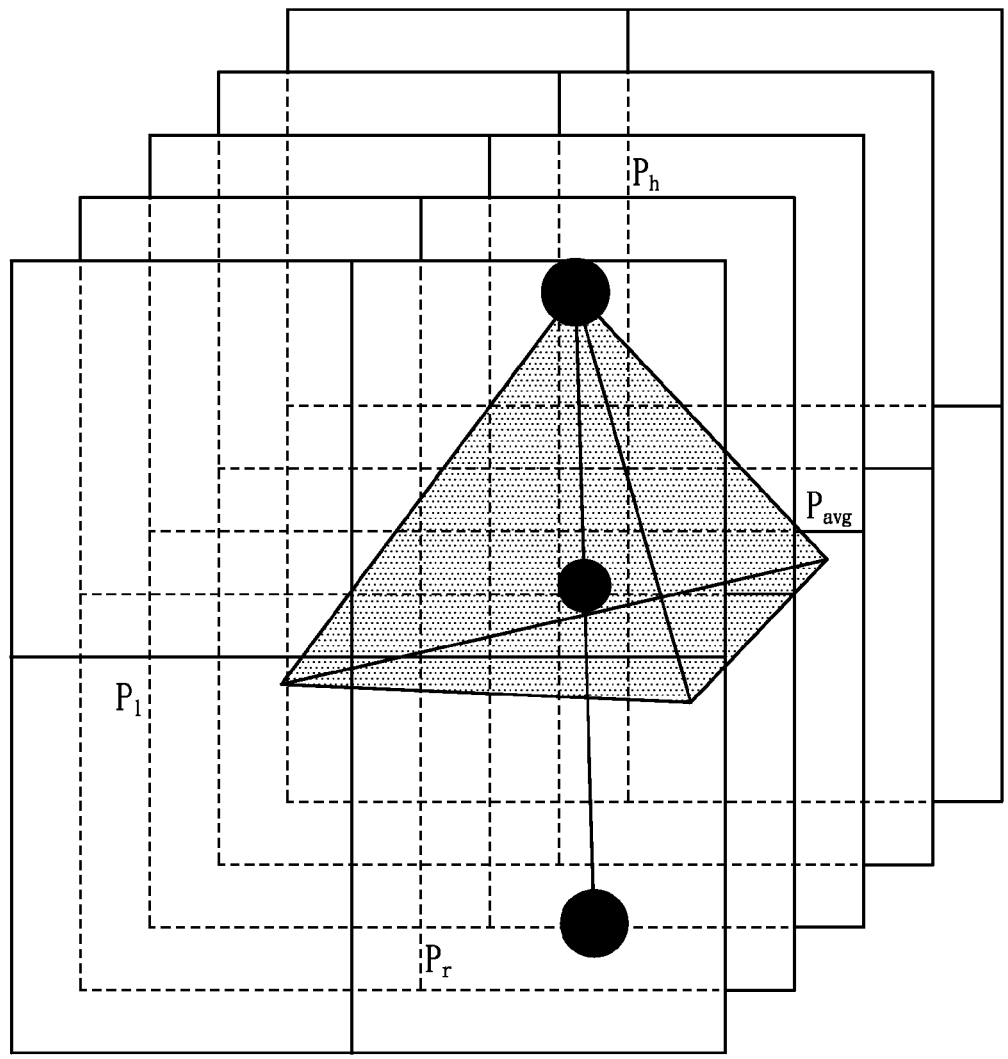
FIG. 3 illustrates a simplex for motion estimation method of multi-reference frames.

For the 2-D search space in the single-reference-frame ME, three points are required to form a simplex. For the case of multiple reference frames, four points are required to form the simplex for finding the MV in 3-D space, as shown in FIG. 3.

Besides, sum of squared errors (SSE) is applied as the function to be minimized in this case. The downhill simplex search can be roughly divided into two parts: the initial simplex selection and the iterative update process. In the first part, the initial simplex can be determined by some heuristic method. It is important to select an appropriate initial simplex since we have better chance to find the correct solution very quickly when the actual solution is near or inside the initial simplex. After the initial simplex is determined, the second part is to update the simplex iteratively until the stopping criterion is satisfied. Finally, the point with the lowest function value in the simplex is the final solution.

Initial Simplex Selection

A traditional simple initialization method for downhill simplex search is to find three points around the center of the current block. This method works well for blocks with small motion vectors. However, the performance decreases when the motion vectors are large. Therefore, an initialization method is proposed to select an appropriate initial simplex from motion prediction results.

Figure 4:
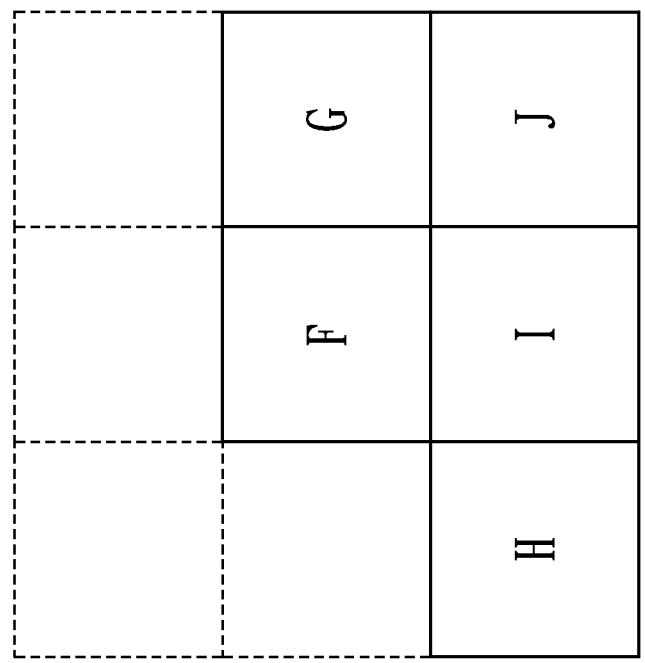
FIG. 4 illustrates an embodiment of the selection of initial simplex of the motion estimation in accordance with the present invention.
Figure 4:
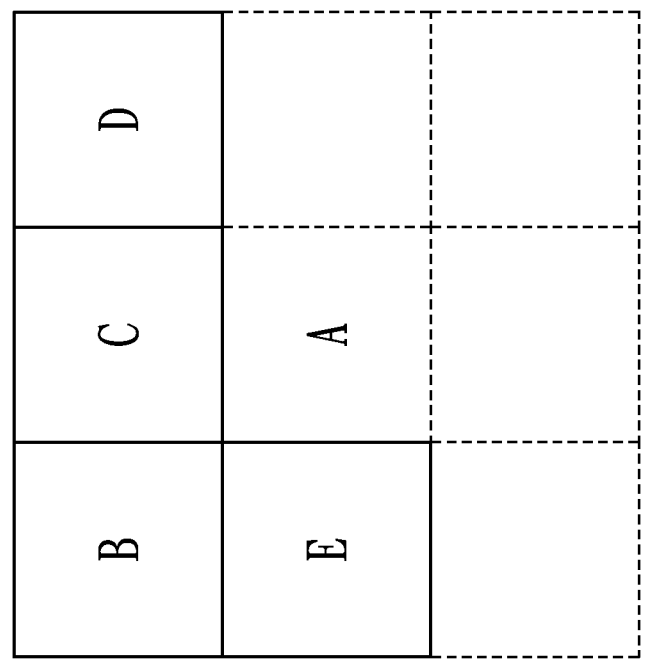

As the video coding standards predict motion vectors in the encoding processes, the current motion vector MV can be predicted from the estimated motion vectors available in the neighboring blocks at the current or previous frame. As shown in FIG. 4, the MVs of the neighboring blocks at the current and previous frames are utilized. The motion vectors of block B, C, D, and E are averaged to obtain a candidate, called $MV_{c1}$, and the motion vectors of block G, H, I, and J in the previous frame are averaged to obtain another candidate, called $MV_{c2}$. Besides, the motion vector of block F and the zero vector (0, 0) are chosen as candidates $MV_{c3}$ and $MV_{c4}$, respectively.

There are two possible ways to determine an appropriate initial simplex from the four candidates. One is to choose the candidate with the smallest SSE as the starting center and then find three nearest neighboring grid points to be an initial simplex. The other is to choose three points from the four candidates directly to form an initial simplex. The former can provide a more localized simplex, and the latter has the advantage of better computational efficiency. The latter is adopted in our experiments.

Initial Simplex Selection for Multi-Reference-Frame ME

For the selection of the initial simplex for the multi-reference-frame motion estimation, both spatial and temporal properties are considered. For the spatial property, most of the motion vectors are small and distributed around zero motion vector (0, 0). Regarding the temporal property, it is most probable that the best MVs occur in the most recent reference frame. However, more reference frames can provide better prediction results especially when there is occlusion in a video sequence or the image frame contains rich textures.

In many multi-reference-frame motion estimation algorithms, the same algorithm used in the single-reference-frame ME is applied to each of the multiple reference frames directly to find motion vectors. Consequentially, the computational complexity increases a lot as the number of reference frames increases. It is also not very efficient to apply the downhill simplex search to each of the previous reference frames to find motion vectors. Since the downhill simplex search uses n+1 points for the n-dimension search space, a collection of four points are needed to form the simplex for the 3-D search space in multi-reference motion estimation.

Generally, the motion field varies slowly and smoothly. The correlation between motion vectors of neighboring blocks in temporal domain can be exploited to find the initial simplex. The motion vector in the previous frame can be traced along the motion trajectories and composed by:

$$MV_n^{-k} = MV_n^{-kl} + MV_{n-kl}^{-(k-kl)}$$

where $MV_n^{-k}$ represents the motion vector of frame n referring to the previous k-th frame.

Figure 5:
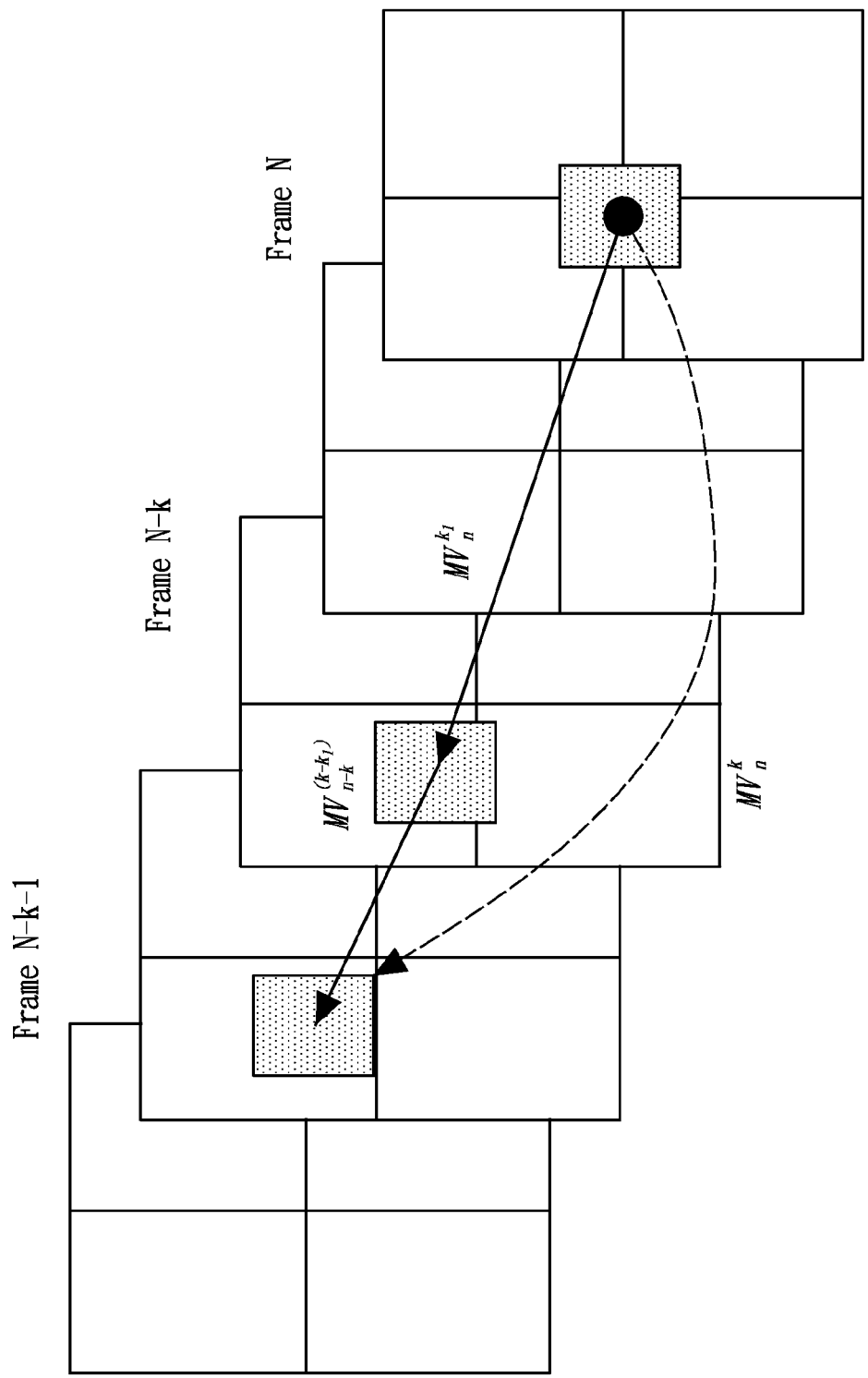
FIG. 5 illustrates a trajectory of motion vector of multi-frame of motion estimation in accordance with the present invention.

Additionally, it can be composed by the motion vector of frame n referring to the previous $k_l$-th frame and the motion vector of frame n−$k_l$ referring to the previous (k−$k_l$)-th frame. FIG. 5 shows the relations between motion vector and its trajectory. For example, $MV_n^{-5}$ can be composed of $MV_n^{-4}$+ $MV_{n-4}^{-1}$.

In this embodiment, the approximate motion vectors obtained by tracing motion trajectories in the reference frames are adopted to form the initial simplex. The steps are given as the following: In each frame, the single-reference downhill simplex search is applied to find the motion vector in the previous frame first. In other words, $k_l$ equals to one in our experiments. Secondly, motion vectors in any other reference frames are composed from the previous results. For example, if five reference frames are used and the current frame number is six, $MV_6^{-1}$, $MV_5^{-1}$, ..., and $MV_2^{-1}$ are determined by the single-reference downhill simplex search in the first step. In the second step, $MV_6^{-2}$ can be composed by $MV_6^{-1}+MV_5^{-1}$. Then, $MV_6^{3}$ can be composed by $MV_6^{-2}+MV_4^{-1}$, and so on. In the last step, four motion vectors among all candidates with the minimal SSE values are chosen to form the initial simplex.

Stopping Criterion

If two of the three points, $P_h$, $P_m$, and $P_l$, move to the same point, then the simplex is degenerated and the iteration should stop, i.e., the iteration terminates when $$P_h = P_m \text{ or } P_h = P_l \text{ or } P_m = P_l$$

In addition, some improved schemes are used in the downhill simplex search ME algorithm to achieve better efficiency and compression quality.

New Location Rounding Scheme

Figure 6:
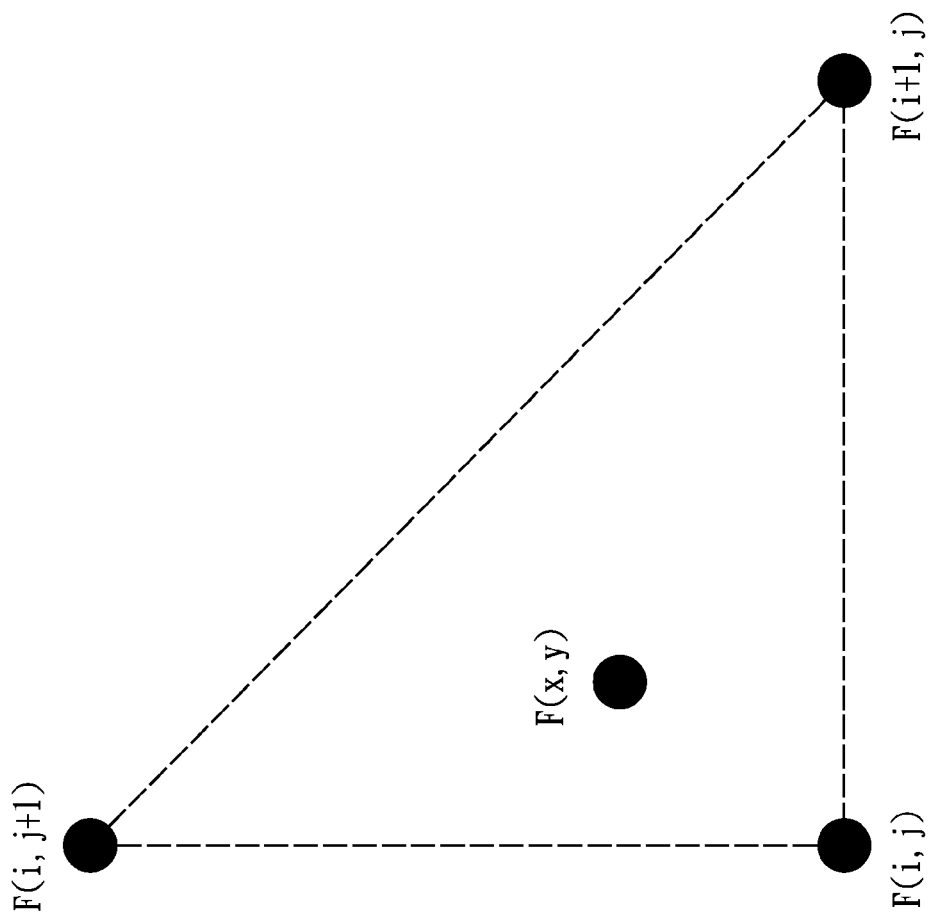
FIG. 6 illustrates the replacement at fractional position of the motion estimation in accordance with the present invention.

In the downhill simplex search, averaging the points or in the shrinkage step may cause fractional point coordinates. Accurate interpolation techniques for computing the function values at the fractional points require more computational cost. Although the simplest rounding method can be used to round the search location to the nearest integer point, it may degrade the coding accuracy. Therefore, a special rounding scheme is proposed to avoid sophisticated interpolation or simple rounding. As shown in FIG. 6, (x,y) is a point with fractional position. The coordinates (i, j), (i+1, j) and (i, j+1) are three neighboring integer points. The function F represents the SSE function of the block. In our special rounding scheme, F(i, j), F(i+1, j) and F(i,j+1) are calculated since the purpose of BMA is to find the most similar block with the smallest SSE value and the downhill simplex search uses a triangle in 2D space to minimize function values. The location with the smallest SSE value among the three nearest integer neighbors can be used as the rounding result for the point (x, y). If (x, y) is located between two points or falls in the center of four points, two or four neighbors are used. In multiple reference frames, three neighboring integral points with the same temporal displacement are compared first. Then, the smallest is chosen from all candidates.

Early-Stop Scheme

In the downhill simplex search, the point with the highest SSE, namely $P_h$, is iteratively replaced with a better point. However, the newly calculated points usually have a higher SSE than that of the current $P_h$. Therefore, when the SSE of the new point is computed, the SSE computation can be terminated as soon as the accumulative SSE of the new location exceeds the SSE of $P_h$. The early-stop scheme can be applied in the iteration steps or refinement of the downhill simplex search. It helps reduce the computational load greatly. It is more significant in SSE than in the sum of absolute differences (SAD) error measure. Note that, in our experiments, the total number of effective search locations is used to measure the efficiency of BMA. When the SSE accumulation is aborted due to the early-stop scheme, the portion of SSE that has been calculated is counted as a fractional search location depending on when it was terminated in our experiment.

ME Refinement

Sometimes, the search results may converge to suboptimal points. They are usually very close to the global minimum. Therefore, a one-pixel refinement is provided to search the eight nearest neighbors after the convergence of the iterative process. Note that it only slightly increases the computational cost of the motion estimation because most of these neighbors have already been searched.

Six block matching algorithms are compared as follows, including full search (FS), four step search (FSS), diamond search (DS), simplex minimization search (SMS), our proposed downhill simplex search (DSS) and multi-reference full search (MR-FS) with our multi-reference frame downhill simplex search (MR-DSS) through experiments on four benchmarking video sequences (Foreman, Coastguard, News, and Container). The Foreman sequence is a popular video because it contains different motion directions and large motions in the video. The Coastguard sequence contains fast movement through the whole sequence. The News sequence almost remains static in most areas except the small area around the human face. The Container sequence contains slow and uniform motions. The formats of these sequences are listed in Table 1. The average number of search locations and the Peak Signal Noise Ratio (PSNR) for each frame are computed. PSNR indicates the quality of video compression, the higher one is the better.

TABLE 1

| Sequence Name | Resolution | Frames |
|---|---|---|
| Foreman | 176 × 144 | 320 |
| Coastguard | 176 × 144 | 97 |
| News | 176 × 144 | 200 |
| Container | 176 × 144 | 180 |

Table 2 shows motion estimation results of four sequences computed by different algorithms.

TABLE 2

| | Foreman | | Coastguard | | News | | Container | |
|---|---|---|---|---|---|---|---|---|
| BMA | PSNR | Locations | PSNR | Locations | PSNR | Locations | PSNR | Locations |
| FS | 32.21 | 82104 | 33.25 | 82104 | 37.64 | 82104 | 42.17 | 82104 |
| FSS | 31.73 | 1703.99 | 33.13 | 1507.57 | 37.61 | 1255.12 | 42.17 | 1219.58 |
| DS | 31.77 | 1595.29 | 33.17 | 1054.94 | 37.61 | 965.75 | 42.16 | 921.59 |
| SMS | 31.31 | 1106.33 | 32.53 | 1478.89 | 37.54 | 1045.95 | 42.13 | 1043.76 |
| DSS | 31.94 | 645.58 | 33.23 | 548.96 | 37.59 | 515.96 | 42.13 | 499.73 |

As shown in Table 2, the proposed method of the present invention significantly outperforms the other methods on the Foreman sequence and Coastguard sequence because they contain larger MVs. When the MVs are large, most fast BMAs, such as DS and FSS, normally require more computational cost for motion estimation, while the proposed DSS algorithm is quite stable for videos with different types of motion. Moreover, although PSNR value of DSS of the present invention is smaller than that of FS, it is comparable to the other algorithms and the number of search locations is lowest (much less than FS algorithm), indicating the computation cost or time is much effective.

In addition, multi-reference downhill simplex search is also tested. The total number of reference frames is set to 5, which complies with H.264 coding standard. The test results are shown in Table 3. MRFS stands for Multi-Reference Full Search, and MRDSS stands for Multi-Reference Downhill Simplex Search in accordance with the present invention.

TABLE 3

| BMA | Ref | Foreman | | Coastguard | | News | | Container | |
|---|---|---|---|---|---|---|---|---|---|
| | | PSNR | Locations | PSNR | Locations | PSNR | Locations | PSNR | Locations |
| FS | 1 | 32.21 | 82104 | 33.25 | 82104 | 37.64 | 82104 | 42.17 | 82104 |
| DSS | 1 | 31.94 | 645.58 | 33.23 | 548.96 | 37.59 | 515.96 | 42.13 | 499.73 |
| MRFS | 3 | 32.85 | 232317 | 33.53 | 232317 | 37.75 | 232317 | 42.23 | 232317 |
| MRDSS | 3 | 32.33 | 1393.24 | 33.33 | 1122.76 | 37.61 | 861.41 | 42.20 | 804.59 |
| MRFS | 5 | 33.15 | 387195 | 33.61 | 387195 | 37.80 | 387195 | 42.42 | 387195 |
| MRDSS | 5 | 32.47 | 1721.16 | 33.41 | 1380.87 | 37.65 | 1080.37 | 42.21 | 1004.61 |

As shown in Table 3, in comparison with MRFS for 3 or 5 reference frames (Ref), MRDSS has much less search locations and comparable PSNR.

According to the above embodiment, DSS or MRDSS algorithms of the present invention can effectively reduce computation cost for motion estimation and would not impact image quality.

The above-described embodiments of the present invention are intended to be illustrative only. Numerous alternative embodiments may be devised by those skilled in the art without departing from the scope of the following claims.

What is claimed is:

1. A motion estimation method for video compression executed by a computing device, comprising the steps of:
   (a) determining an initial simplex comprising three points based on motion vectors in blocks of a current frame and a previous frame;
   (b) replacing a point having a largest function value among the three points with a point having a smaller function value to form a simplex, and implementing reflection, expansion, contraction, and shrinkage to the simplex to find a replacing point by a downhill simplex search; and
   (c) repeating step (b) until two points of the three points of the simplex converge to a same point;
   wherein the shrinkage is implemented after failure of implementing contraction; and
   wherein the shrinkage is used to predetermine a shrinkage point, wherein the shrinkage point is a middle point located between one of the three points and one of rest two points.

2. The motion estimation method for video compression in accordance with claim 1, wherein the motion vectors are selected from candidates of:
   mean value of motion vectors of preceding blocks with reference to a current block in a current frame;
   mean value of motion vectors of succeeding blocks with reference to a block in the previous frame corresponding to a current block;
   a motion vector of a block in the previous frame corresponding to a current block of the current frame; and
   a zero vector.

3. The motion estimation method for video compression in accordance with claim 2, wherein a candidate has a smallest sum of squared errors is selected as a center of the simplex, and three most close grid points to the center are selected as the three points of the initial simplex.

4. The motion estimation method for video compression in accordance with claim 2, wherein three of the four candidates are selected as the three points of the initial simplex.

5. The motion estimation method for video compression in accordance with claim 1, wherein the function value is in response to a function of sum of squared errors.

6. The motion estimation method for video compression in accordance with claim 1, wherein if a function value of a reflection point is smaller than the function value of a middle point of the three points of the simplex in reflection operation, a point with the largest function value is replaced with the reflection point.

7. The motion estimation method for video compression in accordance with claim 1, wherein if a function value of a reflection point is smaller than a smallest function value of the three points of the simplex, the expansion is conducted.

8. The motion estimation method for video compression in accordance with claim 7, wherein if a function value of an expansion point is smaller than a smallest function value of the three points of the simplex, a point with a largest function value is replaced with the expansion point.

9. The motion estimation method for video compression in accordance with claim 1, wherein if a function value of a reflection point is larger than or equal to a largest function value of the three points of the simplex in reflection operation, the contraction is conducted.

10. The motion estimation method for video compression in accordance with claim 9, wherein if a function value of a contraction point is smaller than a largest function value of the three points of the simplex in contraction operation, a point with a largest function value is replaced with the contraction point.

11. The motion estimation method for video compression in accordance with claim 9, wherein if a function value of a contraction point is larger than or equal to a largest function value of the three points of the simplex in contraction operation, the shrinkage is conducted.

12. The motion estimation method for video compression in accordance with claim 1, wherein in the step (b), if a replacement point is a fractional point, an integer point closest to the fractional point is selected as the replacement point.

13. The motion estimation method for video compression in accordance with claim 1, wherein in the step (b), the computation of the function values are stopped when accumulation of the function values is larger than a largest function value of the three points of a current simplex.

14. The motion estimation method for video compression in accordance with claim 1, further comprising the step of checking nearest neighbors of a convergence point after step (c) to verify the convergence point is optimal.

15. A motion estimation method for video compression executed by a computing device, comprising the steps of:
  (a) determining an initial simplex comprising four points based on motion vectors of a current frame with reference to a plurality of previous frames;
  (b) replacing a point having a largest function value among the four points with a point having a smaller function value to form a simplex, and implementing reflection, expansion, contraction, and shrinkage to the simplex to replace to find a replacing point by a downhill simplex search; and
  (c) repeating step (b) until two points of the four points of the simplex converge to a same point;
  wherein the shrinkage is implemented after failure of implementing contraction; and
  wherein the shrinkage is used to predetermine a shrinkage point, wherein the shrinkage point is a middle point located between one of the three points and one of rest two points.

16. The motion estimation method for video compression in accordance with claim 15, wherein the function value is in response to a function of sum of squared errors.

17. The motion estimation method for video compression in accordance with claim 15, wherein four motion vectors with smallest function values are selected as the four points of the initial simplex.

18. The motion estimation method for video compression in accordance with claim 15, wherein a motion vector of the current frame with reference to a previous frame ahead of the current frame by a plurality of frames is obtained by adding segmented motion vectors.

19. The motion estimation method for video compression in accordance with claim 15, wherein a motion vector of the current frame with reference to a previous frame ahead of the current frame by a plurality of frames is obtained according to the following equation:

$$MV_n^{-k} = MV_n^{-k_1} + MV_{n-k_1}^{-(k-k_1)}$$

where $MV_n^{-k}$ represents the motion vector of frame n referring to the previous k-th frame.

* * * * *